No. 607,608. Patented July 19, 1898.
M. J. SHIELS.
RHEOSTAT.
(Application filed Jan. 7, 1898.)
(No Model.) 2 Sheets—Sheet 1.

WITNESS
C. W. Benjamin
F. H. Donis

INVENTOR
Michael J. Shiels
BY
ATTORNEY

No. 607,608. Patented July 19, 1898.
M. J. SHIELS.
RHEOSTAT.
(Application filed Jan. 7, 1898.)
(No Model.) 2 Sheets—Sheet 2.
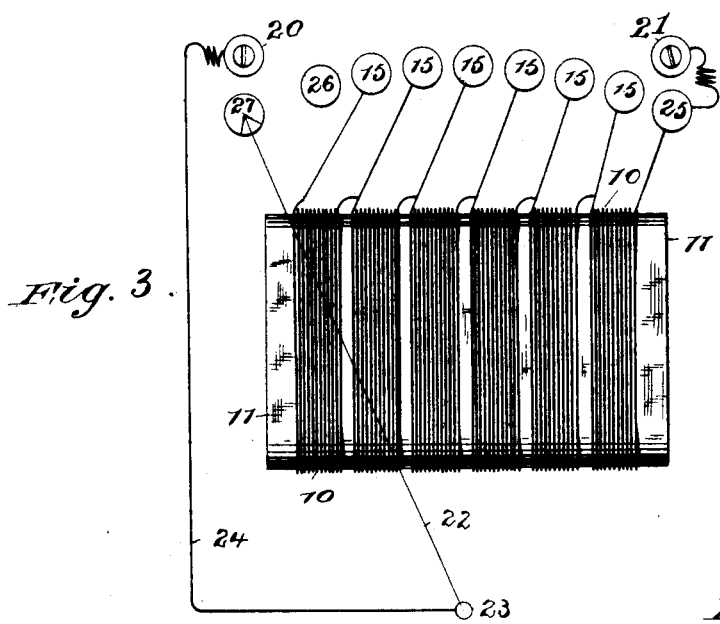
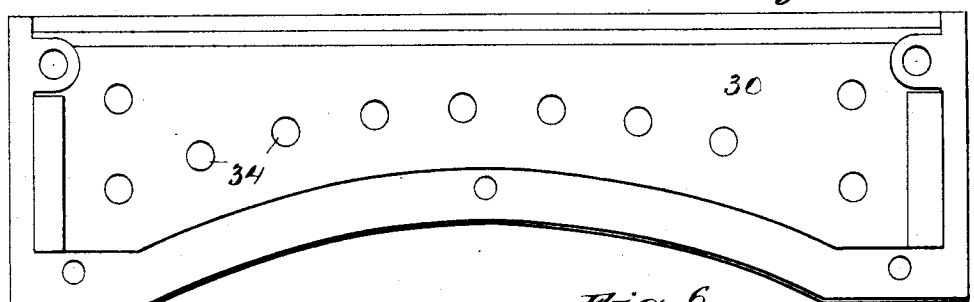
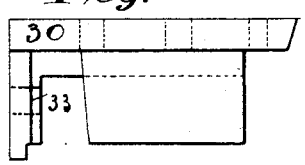
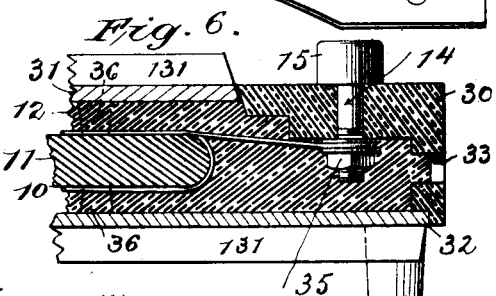
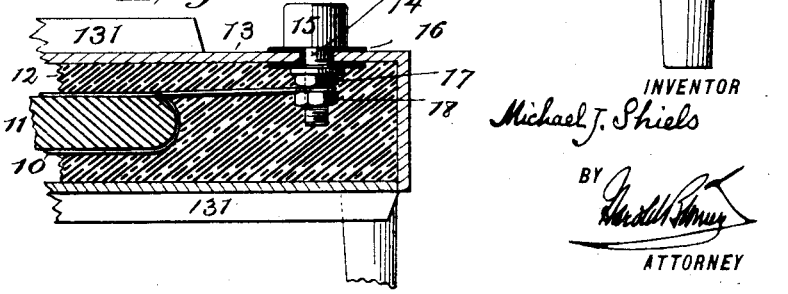
WITNESS
INVENTOR
Michael J. Shiels
BY
ATTORNEY

UNITED STATES PATENT OFFICE.

MICHAEL J. SHIELS, OF WESTFIELD, NEW JERSEY.

RHEOSTAT.

SPECIFICATION forming part of Letters Patent No. 607,608, dated July 19, 1898.

Application filed January 7, 1898. Serial No. 665,903. (No model.)

*To all whom it may concern:*

Be it known that I, MICHAEL J. SHIELS, of Westfield, New Jersey, have invented certain new and useful Improvements in Rheostats, of which the following is a description, referring to the accompanying drawings, which form part of this specification.

The nature of the invention is such that it will be most readily understood by reference to the accompanying drawings and the description thereof, although it must be understood that the drawings only show the particular embodiment of the invention which I at present prefer and that the details are subject to much modification without departing from the principles and novel features of the invention pointed out in the claims.

The invention relates most nearly to that class of rheostats in which the resistance-coils are embedded in cement and the cement inclosed within a metallic casing designed to radiate heat.

Figure 1:
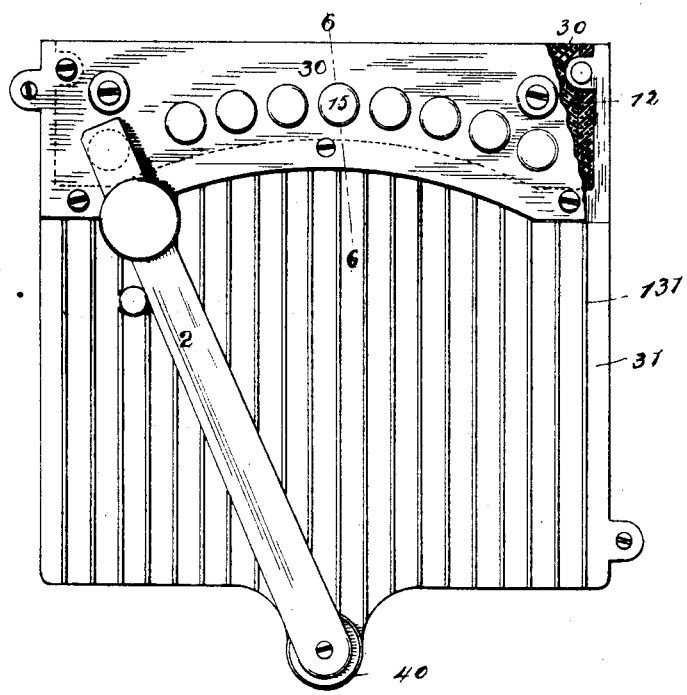
Figure 2:
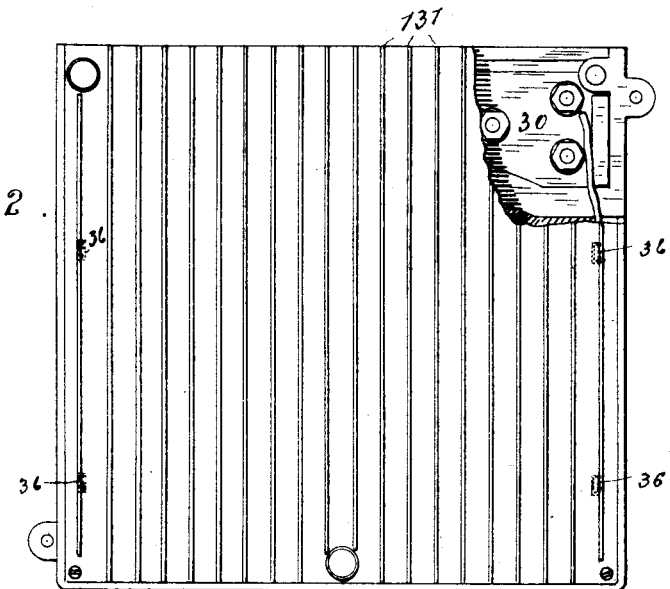

In the drawings, Figure 1 is a face view of the rheostat embodying my improvement, one corner of my exposed insulating-plate being broken away to show the interior. Fig. 2 is a rear view of the same rheostat, one corner of the casing being broken away and the cement being removed to show certain electrical connections. Fig. 3 is an illustration, partly diagrammatic, of the resistance-coils and connections, showing also the spool or support for the coils. Fig. 4 is a rear or back view of the insulating-plate which forms a portion of the casing of my rheostat. Fig. 5 is an end view of such plate. Fig. 6 is a detailed cross-section on the plane 6 6 of Fig. 1. Fig. 7 is a similar cross-section of the most nearly related form of rheostat prior to my invention.

As many of the features shown in Figs. 6 and 7 are the same, it will be convenient to refer first to Fig. 7 as showing the elements which I do not claim as my own invention.

In Fig. 7 the resistance-coil 10 is shown on the insulating plate or support 11, which is embedded on all sides in the cement mass 12. The cement 12 is inclosed within an iron casing 13, which is provided with ribs 131 for the purpose of giving greater heat-radiating surface. The terminals from the coils 10 are in each case brought up through the iron casing 13 by means of insulated posts 14, terminating in the resistance-contacts 15. These posts 14 have to pass through the iron plate or casing 13 and be carefully insulated therefrom, as at 16. Two nuts 17 and 18 are required in the best construction, the nut 17 holding the post 14 and contact 15 firmly in place, so that the upper surface can be finished off and made true to permit the movement of the contact-arm over it. The nut 18 is required to secure the terminal of the coil 10 to the post 14. If the nut 17 were employed for this purpose, it would necessarily loosen the post 14 when the terminal of the coil 10 was being secured to it, and this might necessitate the refinishing of the top of the contact 15 in order to make it true in its relation to the other contacts and the sweep of the contact-arm. The diagram Fig. 3 shows the arrangement and connection of the coils as connected, for instance, in a starting-rheostat, 20 and 21 being the binding-post of the rheostat and 22 the movable contact-arm pivoted at 23 and electrically connected with the binding-post 20 by the conductor 24. The coils 10 are connected, as usual, in series, the contacts 15 being connected with the junction of each pair of coils, as seen in diagram, and the end coil being connected with the last contact 25, and thence to the binding-post 21. Contacts 26 and 27 are dead—that is to say, they are not connected with any other point. When, therefore, the contact-arm 22 rests upon the contact 27 or 26, the circuit is open, and as it passes thence to the right the circuit is closed through less and less resistance, until at the contact 25 the resistance is all cut out and the current may reach its maximum amount. The diagram Fig. 3 applies equally to the former device shown in Fig. 7 and that shown in the other figures and is not, therefore, a part of my invention.

Under my invention the contacts of the rheostat are mounted upon and extend through an insulating-plate 30, which forms part of the face of the rheostat, the remainder being formed of iron or other preferably heat-conducting material 31, which may be provided with radiating-ribs 131. The remainder of the casing preferably consists of iron and may be ribbed at the back, as indicated in Fig. 2, the back plate being marked 32. The insulating-plate 30 forms, with the rest of the casing, a complete inclosure for the coils and cement, the terminals of the coils being secured to the posts 14 of the contacts 15, as shown in Fig. 6. I prefer to make the plate 30 of porcelain of the form clearly indicated in Figs. 4 and 5, so that it may cover part of the face and the whole of one end of the casing. A filling-hole 33 is provided, so that the cement may be poured in after the coils are set in place and the casing closed. The contacts 15, with their posts 14, fit in holes 34 in the plate 30 and are each secured therein by the nut 35, which serves the double function of securing the post 14 in position and constituting a binding-screw for the terminals of the coils 10. The plate 30 is carefully designed to fit the iron or other portions of the casing 31 32, so as to make a complete inclosure for the cement.

In putting my rheostat together the coils 10 are wound upon the slab 11. The plate 30 and portion 31 of the casing are put together, with the contacts 15 and the posts 14 in place. The terminals of the coils 10 are connected to the respective posts 14 and the binding-nuts 35 screwed up, securing the terminals of the coils and holding the contacts 15 firmly in place upon the plate 30. The contacts 15 are made with parallel upper and lower faces, so that they are merely put in place upon the plane surface of the plate 30 and secured. They are necessarily true and even and do not have to be filed off. After the lower plate 32 of the casing has been put in place the insulating-plate or coil-support 11 is held centrally by any desirable means—such, for instance, as the posts indicated in dotted lines at 36 in Fig. 6. After the casing has been closed up cement is poured in through the hole 33. Cement 12 flows around and entirely embeds the coils 10, their terminals, and the nuts of the binding-posts 14, filling the casing and uniting in one rigid whole the coils, terminals, contacts, insulating-plate 30, and other portions of the casing.

By such construction it will be seen that the coils, terminals, and contacts are at all points widely separated from each other and that arcing or leakage from one contact to another cannot take place without passing either through the air directly from one contact to another or by passing through or along the insulating-plate 30. At the same time the coils are embedded in cement within a casing designed to produce great radiating and cooling action. The whole rheostat is adapted to withstand any heat that can be produced in the resistance-coils up to the point of melting the coils themselves.

By the term "cement" I mean to include any insulating material which may be inserted in the plastic or fluid state to fill in around the coils and occupy the space within the casing. I prefer to use compositions containing Portland or other good quality of hydraulic cement, and after the cement has set I bake the rheostat until it has entirely dried out, so as to produce high insulation.

The mounting of the switch-arm 22 and its insulation from the casing may be accomplished in any approved manner—such, for instance, as by the use of an insulating-bushing 40, Fig. 1, preferably of porcelain.

From the foregoing it will be seen that the shapes of the various parts of my invention may be widely varied without departing from the principles involved or from the novel features pointed out in the following claims.

What I claim as novel, and desire to secure by these Letters Patent, is as follows:

1. In combination in a rheostat, the coils thereof, a casing within which the said coils are contained and supported, part of the said casing consisting of a plate or body of insulating material and the remainder of heat-conducting material, a plurality of switch-contacts mounted on the said plate or body, a plurality of terminal connections from the said coils to the said contacts, insulating-cement within the said casing embedding the said coils and extending between the said coils and the said casing, and a movable contact-arm and connections, substantially as set forth.

2. In combination in a rheostat, the coils thereof, a casing within which the said coils are contained and supported, part of the face of said casing consisting of a plate or body of insulating material and the remainder of the heat-conducting material, a plurality of switch-contacts mounted on the said plate or body and provided with posts, 14, which extend through the said plate or body, a plurality of terminal connections from the said coils, secured to the inner end of said posts, 14, insulating-cement embedding the said coils, said terminals and said inner ends of posts, 14, and extending between the coils and the casing, and a movable contact-arm and connections, substantially as set forth.

3. In combination in a rheostat, the casing thereof consisting in part of insulating material provided with a filling-hole, 33, the switch-contacts, 15, mounted upon the said insulating material and provided with posts, 14, extending through the said insulating material, resistance-coils within the said casing and connected to the inner ends of the said posts, and cement extending from the said filling-hole within the said casing and embedding the said coils, substantially as set forth.

In testimony whereof I have hereunto set my hand this 4th day of January, 1898.

MICHAEL J. SHIELS.

Witnesses:
HELENA FARRINGTON,
HAROLD BINNEY.